United States Patent [19]

Halley

[11] Patent Number: 5,047,993
[45] Date of Patent: Sep. 10, 1991

[54] DETECTION AND CLASSIFICATION FOR MULTI-BEAM SONAR SYSTEMS

[75] Inventor: Robert Halley, La Jolla, Calif.

[73] Assignee: The United States of America as represented by the Secretary of the Navy, Washington, D.C.

[21] Appl. No.: 463,474

[22] Filed: Jun. 8, 1965

[51] Int. Cl.$^5$ .............................................. G01S 15/00
[52] U.S. Cl. ...................................... 367/105; 367/121
[58] Field of Search ............... 343/5 DP, 16, 17.2 PC; 340/3, 6; 328/121, 122; 324/77 C, 77 CS, 77 G, 77 H; 367/105, 121

[56] References Cited
U.S. PATENT DOCUMENTS 2,958,039 10/1960 Anderson .............................. 367/40

Primary Examiner—Daniel T. Pihulic
Attorney, Agent, or Firm—Harvey Fendelman; Thomas Glenn Keough; Truman L. Styner

[57] ABSTRACT

An array of sonar transmitting and receiving transducers are so physically arranged and their signal voltage so combined as to form beams pointing to various points of the compass. In this invention a signal is formed on a different conductor for each beam and the conductors are wiped in rapid succession to determine the presence of any beam signal. Since any signal may be short-lived the total sampling process must be in milliseconds. Any signal that occurs is converted to digital form and is fed into a first recirculating delay line time compression storage loop. All signals are stored in the first loop. Then the cluster of signals pertaining to one beam is read out to a second recirculating delay line time compression storage loop from when it is read out to a variable frequency super-heterodyne and displayed on a cathode ray tube.

4 Claims, 1 Drawing Sheet

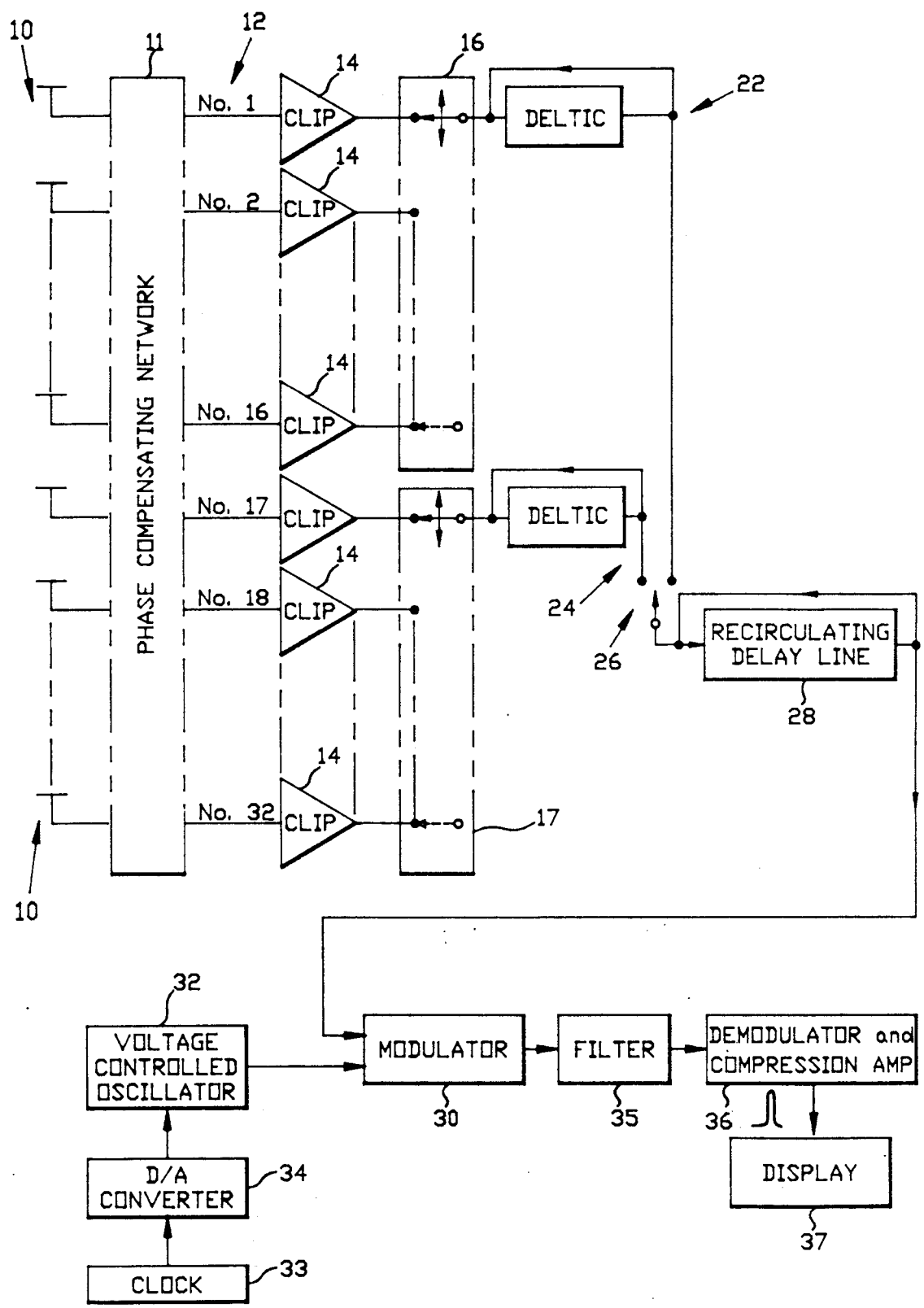

5,047,993

DETECTION AND CLASSIFICATION FOR MULTI-BEAM SONAR SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to acoustic signal processing and is particularly directed to fine grain analysis of sonar signals for purposes of classification of the received signals.

It is now possible for a transducer array to "see" simultaneously in all directions. Signals from the several transducers of the array are processed through phase compensation networks and are so combined that signals will appear in separate circuits corresponding to different discrete directions, or beams.

The introduction into submarines of multi-beam sonars using preformed beams has posed additional requirements in the areas of detection and classification. It is, of course, desirable to instantly display all signals regardless of direction in sufficiently fine grain detail to enable the operator to classify the signal as to the type of ship, for example, from which the signal is received. While pre-formed beam systems have the advantage of making all of the incoming data instantly available for use, they must as a consequence require the handling of data in amounts which are increased by a direct factor of the number of pre-formed beams. Present classification methods based on fine grain spectrum analysis and long time integration may, if carried to their logical optimum, require that many millions of bits of data be handled and stored for a single beam.

The best techniques presently known in data analysis, storage and display makes it completely unfeasible from the standpoint of size, weight and cost to install aboard ship an optimum classification system for each beam of a multibeam sonar system. It is the purpose of this invention to propose a reasonable compromise among the various factors involved which will provide a nearly optimum detection and classification system.

SUMMARY OF THE INVENTION

The object of this invention is to provide an improved detection and classification system for multibeam active or passive sonars.

The objects of this invention are attained by rapidly sampling the signal voltage on each of the pre-formed beam leads and feeding a digitized form of the information to a recirculating delay line time compression storage loop. The sampling rate is at least twice the highest frequency expected to be received and analyzed so that the frequency of the received signal may be completely defined. The storage capacity of the line is sufficient to receive the samples of all beams for a period of time determined by the filter bandwidth of the scanning circuits. When the line is full the bits from each beam will appear clustered sequentially in the line. The clusters then pass through a two position transfer switch to a second recirculating delay line, the function of the transfer switch being to transfer all the signal bits associated with a single beam or cluster from the first line to the second line. The two lines operate at the same clock rate, and the second line is of such a length as to receive only the signals of one beam. The frequency multiplication ratio involved in this process can be made very high. By means of a swept frequency oscillator and a modulator the frequency of each beam can be spread out on the display screen of a cathode ray tube.

Other features and objects of this invention will become apparent to those skilled in the art by referring to the specific embodiment disclosed in the following specification.

BRIEF DESCRIPTION OF THE DRAWING

The FIGURE is a block diagram of the preferred embodiment.

DESCRIPTION OF THE PREFERRED EMBODIMENT

For convenience specific values of frequency and switching rates will be referred to hereinafter but it will be apparent that such specific values in no way limit the generalities of the invention. It will be assumed that the array of n transducers, 10, is connected to the phase compensating networks indicated generally at 11. The purpose of the networks is to obtain, say, 32 beam voltages for 32 discrete directions. That is, the networks 11 simultaneously applies 32 voltages to the 32 leads 12 to indicate respectively, the signal received in 32 discrete azimuthal directions from the array. The beam signals are amplified, and leveled in amplitude, in the clipper amplifiers 14.

Where 32 beam signals are to be processed, it had been found desirable to divide the beam signals into two groups and to process them separately in storage and logic networks. The one group of beam voltages 1 to 16 are applied to the input terminals of the switch mechanism 16 and the remaining beam voltages 17 to 32 are applied to the input terminals of switch mechanism 17. To suggest the mode of operation of switches 16 and 17, the mechanical equivalents of the actual switches are shown. Only electronic switching would have the speed contemplated here.

According to this invention frequency information of each sampled beam is stored in the delay line time compression loop 22. One such storage device now known in the art as "DELTIC", is described in the U.S. Pat. No. 2,958,039 of V. C. Anderson, issued Oct. 25, 1960, and entilted "Delay Line Time Compressor". One DELTIC in common use comprises means for converting the signal samples to pulses, as shown at 14, which are then admitted to one end of an acoustic delay line and recirculated at high rates, each succeeding new pulse being introduced behind the most recently stored sample after it has made one or more recirculations through the delay line. Alternatively, where the number of bits is small, the storage device may utilize a digital shift register. The information is circulated in the register with a new sample being added with each recirculation, as in the case of the acoustic delay line.

The delay line of storage device 22 is of sufficient length to receive and hold the digital information of 16 beams. Preferably, one bit from each of the 16 beams is inserted during each recirculation, the new bits from each beam being introduced immediately behind the latest previously stored sample from the same beam. When the line 22 is full all of the bits of each beam will appear clustered sequentially in the line.

The output from delay line 22 then passes through the two-position transfer switch 26 to a second delay line 28. One of the functions of the transfer switch is to transfer periodically the bits associated with a single beam from line 22 to line 28. Line 28 operates at the same clock rate as line 22 and must store all of the data bits of one beam signal. The length of this line is consequently, 1/16 of the length of line 22, where 16 beams are multiplexed.

Each beam signal may now be displayed and frequency analyzed by reading out the contents of delay line 28 into the modulator 30. The frequency of the modulator is swept by the voltage-controlled oscillator 32. The range and speed of the swept frequency is determined by clock 33 the digital output of which is converted to an analog voltage in the converter 34. Bandpass filter 35 follows the modulator and the center of the pass band is determined so all frequencies in the range to be analyzed will appear at the modulator output at some time during the sweep of the voltage-controlled oscillator 32. The bandwidth of filter 35 will be determined by the desired analysis bandwidth times the frequency multiplication factors of DELTIC 22 and DELTIC 28. The signal passed by the filter 35 is demodulated and compressed in amplitude in demodulator-amplifier 36 whereupon it is applied to the deflection plates of display device 37. The time base for the sweep of display device 37 is controlled by the master clock 33.

Based on considerations of array gain, background noise level, generalized source characteristics and the system limitations on data storage, the frequency range to be covered may be chosen from 0 to about 600 cycles per second. While certain signal characteristics which are valuable for classification lie outside this frequency range, the 0-600 range should prove to be optimum for most cases in the detection process. If 600 cps is the upper frequency limit, an analysis bandwidth of 2 cps may be chosen, producing 300 bandwidths in the analysis range. This analysis bandwidth is nearly optimum as far as is known from the standpoint of source stability and the overall band coverage.

The parametric values mentioned below are nominal and represent a system with 100% data coverage and zero redundancy. Some changes in these values may be found necessary to allow for fly-back time and similar considerations. It is assumed that the signals from each of the 32 pre-formed beams are available separately and that each may be represented by a single wire at the input of the system. If, instead of 0 to 600 cps it was desired to receive 200 to 800 cps, it would be a simple matter to heterodyne the signal to the new range.

If 600 cps is the upper frequency to be received, 1200 samples per second are required so as to obtain at least two sample voltages for each cycle of the signal highest frequency present in the input signal. This means that switch 16 must operate at a switching rate of 19,200 steps per second which is 1200×16. The output of this switch is then fed to the DELTIC storage delay line 22. Since the filter bandwidth was chosen as 2.0 cps, we must store 0.5 seconds of data or 9600 bits. This corresponds to 600 bits from each of the 16 beams. The recirculation period of the line should be 1/1200 seconds or 833.33 microseconds which becomes the length of line 22 and allows one sample of each beam to be stored during each recirculation period. The clock rate for this line then becomes 11.52 megacycles per second. Clock 33 is set at 11.52 megacycles per second. When the line is full the 600 bits for each beam will appear clustered sequentially in the line, as stated.

Since one of the functions of the transfer switch 26 is to transfer periodically the 600 bits associated with a single beam from delay line 22 to delay line 28, line 28 may operate at the same clock rate as line 22 and must store only 600 data bits. The length of line 28 hence is 52.08 microseconds, which is 1/16 the length of line 22. The frequency multiplication ratio involved in this process is the output rate 11.52 megacycles divided by the input rate 1200 cycles per second or 9600/1. Thus the analysis frequency range is 600×9600 or 5.76 megacycles per second and the analysis filter bandwidth is 19,200 cps. The allowable analysis time for each beam of a 32 beam system is 5/320 seconds and for 16 beams is 0.25 seconds. Since this is exactly one-half of the data storage time there is ample time to perform two such analysis before the data in line 22 is entirely replaced.

Accordingly, the second digital switch 17 and delay line 24, which is indentical to delay line 22, is used to sample and store 0.5 seconds of data from beams 17 through 32. At the conclusion of the analysis period for beams 1 to 16 the transfer switch 26 is switched to the output of line 24 and the analysis of beams 17 to 32 is performed. At the conclusion of this analysis the transfer switch returns to the output of line 22 and the process continues.

It is preferred that the display device comprise fast exposure film for making a nonperishable record for each analysis. From the film may be projected an image of the entire frequency range from all beams throughout the azimuth covered by the transducer array.

Many modifications may be made in the details of the system of this invention without departing from the scope of the appended claims.

What is claimed is:

1. In combination in a detection and a classification system for multiple beam signals;
   an array of uniformly spaced transducers;
   beam forming means for so combining the signals of said transducers as to simultaneously generate, in a predetermined number of separate circuits, beam signals received from different discrete directions;
   a first recirculating delay line time compression storage unit having storage capacity sufficient to receive and simultaneously contain digital information definitive of all of said beam signals;
   a sampling switch for successively feeding digital samples of each of the separate beam signals into said storage unit;
   a second recirculating delay line time compression storage unit having a storage capacity sufficient to receive the signal from one beam only;
   a sampling switch for successively feeding the digital signals of a beam, one beam at a time, from said first storage unit to said second storage unit;
   a sweep frequency oscillator, a modulator, the input circuits of the modulator being coupled, respectively, to the output of said oscillator and to the output of said second delay line, bandpass filter connected to the output of said modulator, and a display device coupled to the output of said filter for displaying the frequencies at the output of said filter.

2. A system for displaying the frequency information of all of the signals of diverging beams of a multi-beam sonar comprising;
   a first and second recirculating delay line storage unit, the first unit having capacity to receive and hold signal information from each of a predetermined plurality of beams, and said second unit having capacity to receive and hold signal information of a single beam;

a sampling switch coupled between the input of said first unit and said multi-beam sonar for successively sampling, time compressing, and storing digital voltages definitive of the frequency information of said plurality of beams;

a transfer switch coupled between the output of said first unit and the input of said second unit for feeding the information of a single beam to said second unit; and means for displaying for analysis the frequency information of the signal of said single beam.

3. In combination in a signal display system;

means for generating voltages in different circuits corresponding to signals received, respectively, from different discrete input channels;

two recirculating delay line time compression storage loops;

means for successively sampling and feeding the signals of one group of said circuits to one of said loops, and means for successively sampling and feeding the signals of another group of said circuits to the other of said loops, the sampling rate of both groups of signals being at least twice the highest frequency to be analyzed;

a third recirculating delay line storage loop having a capacity to hold the signals of a single circuit;

means for transferring one at a time the signals of said groups to said third loop; and means for analyzing and displaying the frequency spectrum of each signal, as it is fed out of said third loop.

4. In the signal display system defined in claim 3, the analyzing and display means comprising;

a modulator connected to the output of said third loop;

a bandpass filter connected to the output of said modulator;

a demodulator and a display device coupled to the output of said filter, and a ramp voltage controlled oscillator connected to said modulator for sweeping the signal frequency to be analyzed to the pass band of said filter.

* * * * *